C. A. LINCOLN.
CAR TRUCK.
APPLICATION FILED JUNE 23, 1910.
986,185.
Patented Mar. 7, 1911.
2 SHEETS—SHEET 1.
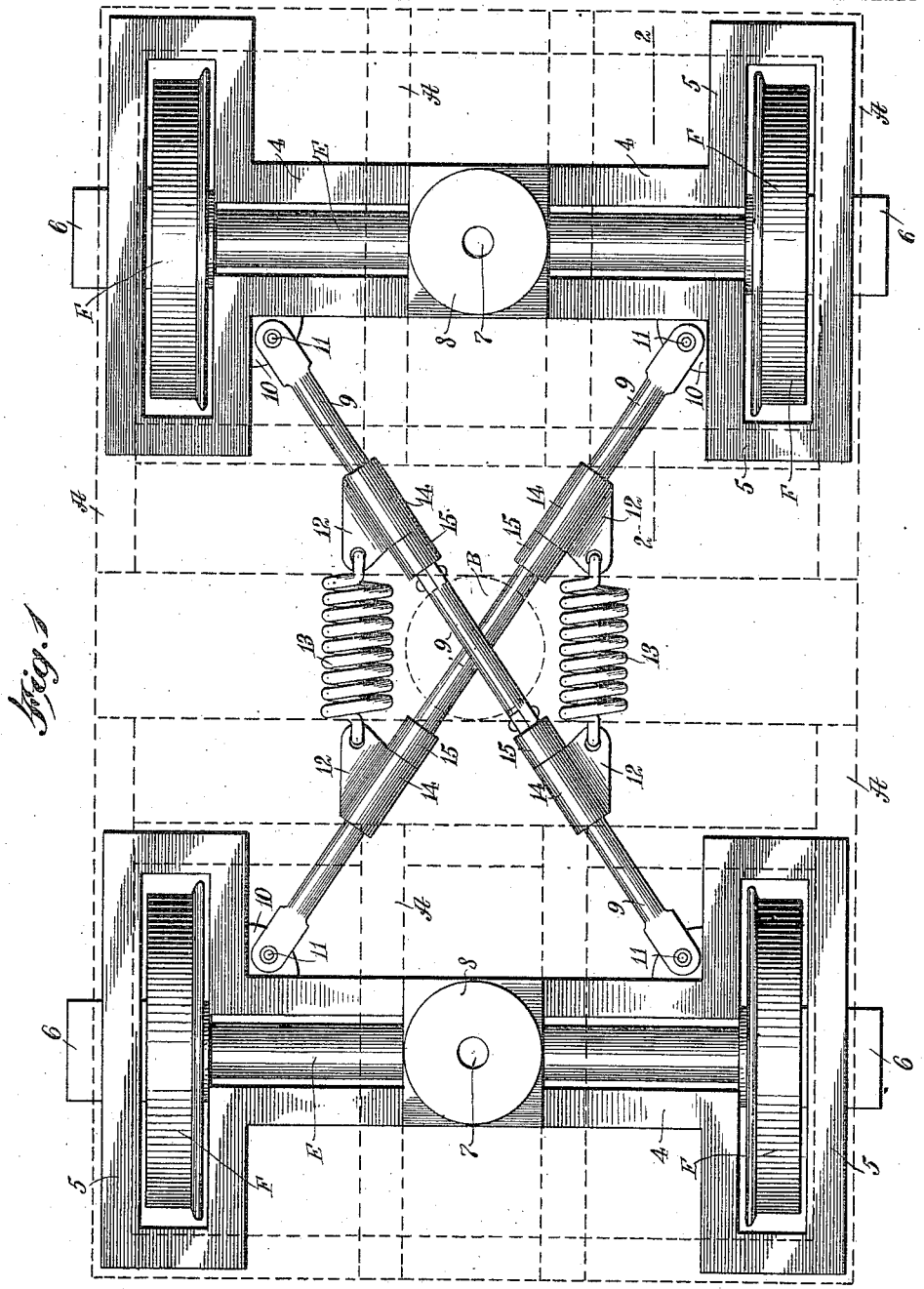
WITNESSES:
INVENTOR
Carlyle A. Lincoln
BY
ATTORNEYS C. A. LINCOLN.
CAR TRUCK.
APPLICATION FILED JUNE 23, 1910.
986,185.
Patented Mar. 7, 1911.
2 SHEETS—SHEET 2.
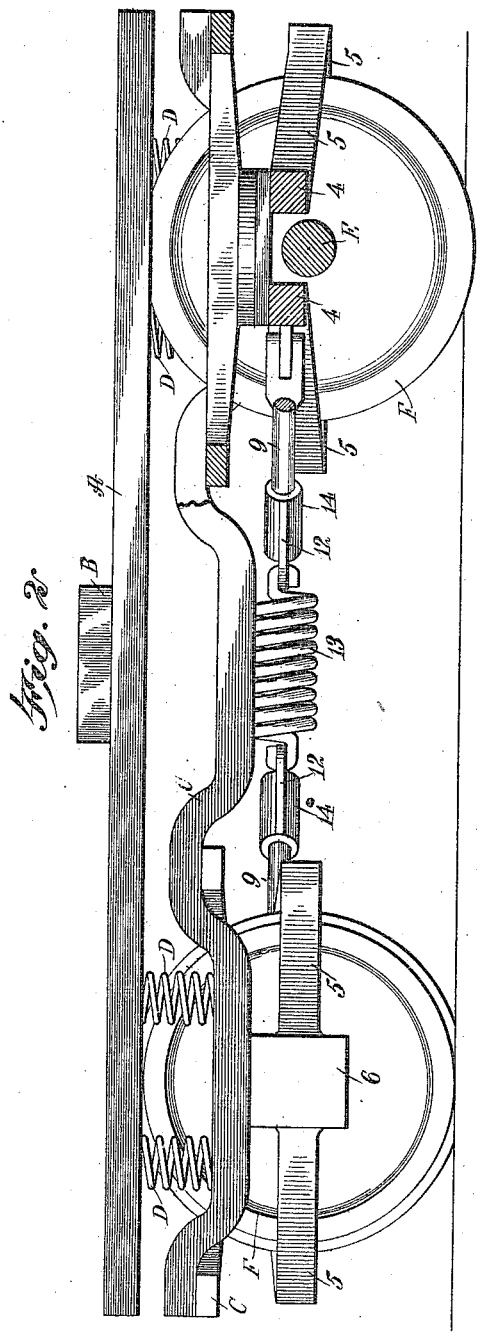
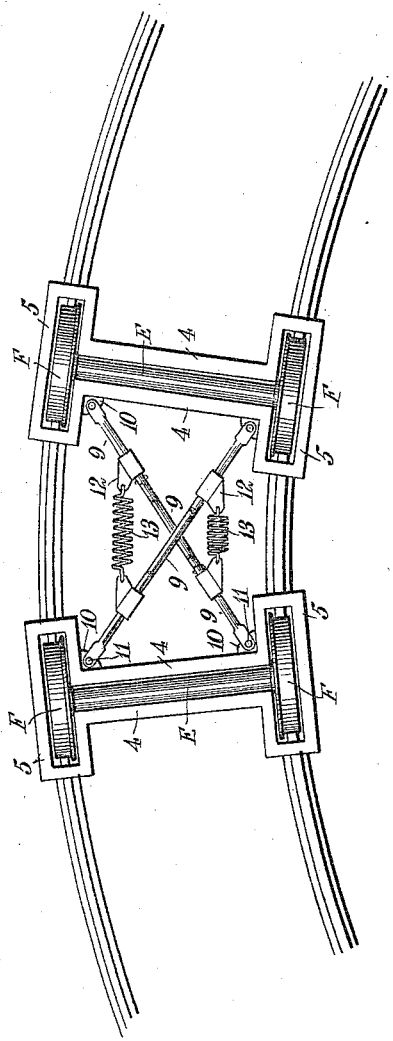
WITNESSES:
INVENTOR
Carlyle A. Lincoln
BY
ATTORNEYS

UNITED STATES PATENT OFFICE.

CARLYLE AUSTIN LINCOLN, OF WAYNE, MAINE.

CAR-TRUCK.

986,185.  Specification of Letters Patent.  Patented Mar. 7, 1911.

Application filed June 23, 1910. Serial No. 568,458.

*To all whom it may concern:*

Be it known that I, CARLYLE A. LINCOLN, a citizen of the United States, and a resident of Wayne, in the county of Kennebec and State of Maine, have invented a new and Improved Car-Truck, of which the following is a full, clear, and exact description.

Among the principal objects which the present invention has in view are: to provide trucks for railway cars constructed and arranged to dispose the axles of the wheels thereof in radial position upon curved sections of a track; to provide means for balancing the swing of the axles of a four wheel truck when the same are adjusted to track on a curved section of the road bed; and to provide a simple, efficient and durable construction for accomplishing the purposes above set forth.

One embodiment of the present invention is disclosed in the structure illustrated in the accompanying drawings, in which like characters of reference denote corresponding parts in all the views, and in which—

Figure 1 is a plan view of a truck constructed and arranged in accordance with the present invention; Fig. 2 is a side elevation, partly in section, taken on the line 2—2 in Fig. 1; and Fig. 3 is a plan view of a truck constructed and arranged in accordance with the present invention, showing the same in its disposition on a curved section of the road bed.

A truck when constructed in accordance with the present invention is provided with a superstructure or platform frame A, having a pivot block B, both constructed substantially in accordance with the custom of the usual trucks of present manufacture. The brace bars C of the truck are disposed substantially as shown in Fig. 2 of the drawings, and as in trucks of the manufacture of the present day. The brace bars C are separated from the superstructure A by means of springs D, D, constructed and arranged in the usual manner.

The present invention relates more particularly to the mechanism whereby the axles of the truck are angularly disposed with relation to each other, and radially disposed with reference to the radii of the curved section of the road bed. This mechanism necessitates that each axle shall be supported pivotally in the truck or within the superstructure A and brace bars C. For this purpose each pair of wheels and the axle connecting the same, is provided with a journal box supporting frame 4. The frames 4 are extended parallel with the axles E, E and are provided at either end with rectangular framing sections 5, 5. In the outer framing member of the rectangular sections 5 are formed, or rigidly secured, journal boxes 6, 6 to receive the bearing extensions of the axles E, E for the wheels F, F. The frames 4—5 and journal boxes 6, together with the axles E and wheels F, constitute separable and distinct structures from the truck frame formed by the superstructure A and the brace bars C. The frames 4—5 are connected to the main frame by pivots which extend within the sockets 7, 7 formed in the upper surface of the pivot blocks 8, 8. The blocks 8, 8 extend between and rest upon the transversed members of the frames 4, 4.

The frames 4—4, located on opposite sides of the pivot block B of the truck, are pivotally connected by tie rods 9, 9. To receive the rods 9, 9 each of the frames 4—4 is provided with a bracket plate 10. The plates 10 are set in the inner corners formed by the junction of the framing members 4 and the rectangular framing sections 5. Pivots 11, 11 are vertically disposed to permit a horizontal swing of the rods 9, 9. The rods 9, 9 are crossed in the center, each rod being extended between the diagonal opposite corners of the opposite frames 4—5, 4—5. In this manner the distance between the diagonal corners of the two swinging frames is maintained constant, while, by reason of the fact that the rods 9, 9 are not connected where they cross, the two frames are permitted to swing so that the corners of the said side of the frames may be separated or removed each from the other. The constant and equal length of the rods 9, 9 operates to compel a spread of the wheels on one side of the median line of the completed truck, proportioned to the contraction of the wheels on the opposite side of the said truck. Hence, when in passing a curve, the pair of wheels in advance are crowded to conform to the radii of the curve, and the following wheels and axle supporting the same are caused to similarly conform to the radii of the said curve, by the connecting rods 9, 9. The rods 9, 9 are provided with brackets 12, 12, the ends whereof are perforated to receive in holding relation the ends of spiral pulling springs 13, 13.

The operation of the springs 13, 13 is to maintain the parallelity of the axles E, E and frames 4—5, 4—5. When, however, the frames 4—5, 4—5 are forced to assume mutually angular relation, the springs 13 yield to conform to such disposition of the said frames. When the force compelling such disposition is removed, the operation of the springs is to return the said frames to their normal or mutually parallel positions.

It will be understood that this construction may be adapted to all the usual styles of trucks, the truck shown in the accompanying drawings being of a common type.

With a truck constructed as herein shown and described the operation is as follows: The usual track is provided with either an inside guard rail, or a groove in the head of the rail, the inner side whereof operates in a manner similar to the said guard rail. When the forward wheels of the truck impinge upon the said guard rail or side of the groove, the guard rail or groove operates as a drag upon the inside wheel of the forward pair of wheels, and serves to retard or place a drag upon the said inside wheel and the axle connected therewith. This action of the drag upon the wheel, serves to swing the axle and wheels to a position radial to the curve wherein both wheels of the forward pair run free on the track. By reason of the action performed by the rods 9, 9, this swing of the forward axle produces a corresponding swing of the rearward axle of each truck. As the forward axle is disposed in the position radial to the curve, the swing imparted to the rearward axle by the connecting rods 9, 9 produces a position of the said rearward axle also radial to the curve. This co-action of the axles of the truck occurs in ratios of divergence proportioned to the radii of any curve.

The brackets 12, 12 are extended from collars 14, 14. The collars 14, 14 are slidably mounted on the rods 9, 9, as shown in Fig. 1 of the drawings, and are held in normal position by fixed collars 15, 15.

Having thus described my invention, what I claim as new and desire to secure by Letters Patent is:—

1. A car truck, comprising a plurality of centrally pivoted axles provided with carrying wheels; a plurality of crossed tie rods connecting the said axles on opposite sides of a line drawn between the pivots of said axles; and a plurality of resilient members disposed between and connecting the said tie rods arranged to maintain the parallelity of said axles.

2. A car truck, comprising a plurality of centrally pivoted axles provided with carrying wheels; a plurality of crossed tie rods connecting the same axles on opposite sides of a line drawn between the pivots of said axles; and a plurality of pull springs operatively connecting the said axles to normally hold the same in parallel relation.

3. A car truck, comprising a centrally pivoted main truck frame; a plurality of single axle truck frames pivoted to said main frame; a plurality of tie rods pivotally attached to said single axle truck frames and at diagonally opposite portions thereof, the lines between the points of connection of said tie rods crossing in line with the pivot of said main truck; and a plurality of pull springs extended between said tie rods on opposite sides of the median line of said main truck, said springs being arranged to maintain the parallelity of said axles of said trucks.

4. A car truck, comprising a centrally pivoted main truck frame; a plurality of single axle truck frames pivoted to said main frame and provided with journal boxes for the carrying wheels thereof, said journal boxes being disposed in sliding relation with said main truck; a plurality of tie rods pivotally attached to said single axle truck frames and at diagonally opposite portions thereof, the lines between the points of connection of said tie rods crossing in line with the pivot of said main truck; and a plurality of pull springs extended between said tie rods on opposite sides of the median line of said main truck, said springs being arranged to maintain the parallelity of said axles of said trucks.

In testimony whereof I have signed this specification in the presence of two subscribing witnesses.

CARLYLE AUSTIN LINCOLN.

Witnesses:
ELLIS L. LINCOLN,
LILLIAN J. LINCOLN.

Copies of this patent may be obtained for five cents each, by addressing the "Commissioner of Patents, Washington, D. C."